CONTROL SYSTEM AND AND RECEIVER THEREFOR

Filed Nov. 4, 1949 2 Sheets-Sheet 1

INVENTOR.
William G. Coe
BY
Arthur R. Woolfolk
Attorney

Jan. 4, 1955 W. G. COE 2,698,916

CONTROL SYSTEM AND AND RECEIVER THEREFOR

Filed Nov. 4, 1949 2 Sheets-Sheet 2

INVENTOR.
William G. Coe
BY
Arthur R. Woolfolk
Attorney

United States Patent Office 2,698,916
Patented Jan. 4, 1955

2,698,916

CONTROL SYSTEM AND RECEIVER THEREFOR

William G. Coe, East Stroudsburg, Pa., assignor to McGraw Electric Co., Milwaukee, Wis., a corporation of Delaware Application November 4, 1949, Serial No. 125,589

4 Claims. (Cl. 317—141)

This invention relates to a control system and to the apparatus therefor.

In greater detail, this invention relates to a system which provides for the remote control by carrier current of a predetermined frequency superimposed on power lines and controlling the energization of any desired type of apparatus operated by electric power, such as motors, power relays, switches, lamps, heaters, or any other electrically operated apparatus.

Objects of this invention are to provide a system and apparatus which allows the remote control of a single or a plurality of electrically operated devices when a selected frequency is superimposed on the power line and is maintained for certain selected time intervals.

A primary purpose of this invention is to provide a series of receivers which are so arranged in the system that all of the receivers are put into the same position at the first signal that is sent out from the control station, so that if for instance certain of the receivers are in the "on" position and other receivers are in the "off" position, that when an "on" signal is sent from the control station, all of the receivers will be put in the "on" position if not already so, or, on the other hand, are so arranged that all of the receivers will be put in the "off" position if not already so when an "off" signal is sent from the control station.

A further primary object of this invention is to provide a receiver which is controlled by carrier current of a predetermined frequency and which has a self-starting, synchronous motor operating through suitable mechanism including a magnetic clutch for driving an arm or similar member with the clutch arranged to remain normally open and to be closed magnetically when power is supplied to the motor, and to so associate this motor and clutch mechanism with the arm that an externally applied bias will bring the arm back to its initial zero position, the biasing means serving to rotate the cam without rotating the motor.

A further object of this invention is to provide a system and means which are not disturbed by static or similar short or transient impulses, but which respond to the carrier current when the carrier current is maintained for predetermined selected intervals of time, the "on" and "off" positions of the apparatus being obtained by selecting the particular period of time during which the carrier current remains on.

This invention is an improvement over my invention shown in my copending application Serial No. 125,588, filed November 4, 1949, for Control System and Receiver Therefor, and has the additional advantage of avoiding the side strain on the cam shaft which is present where the cam is rotated due to pressure imposed on the cam itself.

This invention has for a still further object the provision of the means for imparting a torsional stress only on the shaft so that the biasing means serves to rotate the shaft in the reverse direction to that imparted to it by the motor when power is cut off from the motor, the arrangement being, as in my previous invention, such that the biasing means is not called upon to rotate the motor when it returns the operating arm or member to its zero position.

In one form of my invention, there is the further object of providing a plurality of selective adjustments for the zero position, so that if it is desired, the time interval for different receivers may be different to thereby allow for a simple selective control of the different receivers or different groups of receivers.

Embodiments of the invention are shown in the accompanying drawings, in which.

Figure 4:
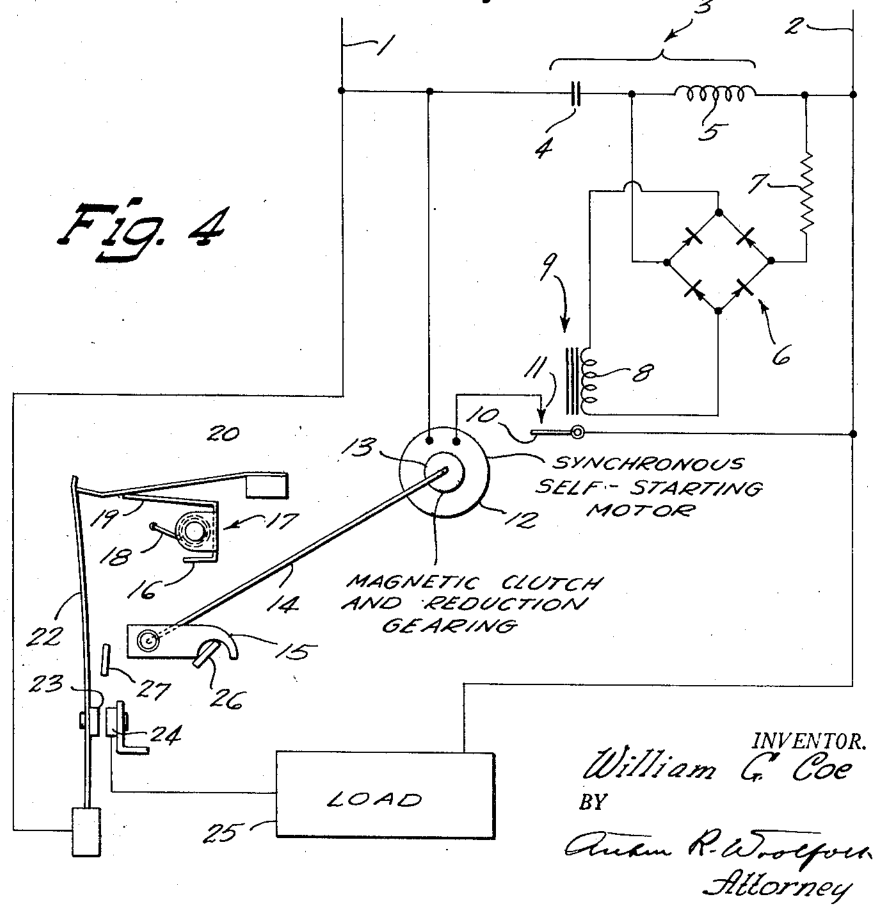
Figure 4 is a view partly diagrammatic showing the system with one of the receivers connected thereto.

Referring to Figure 4 it will be seen that the mains or power lines are indicated by the reference characters 1 and 2. Between these power lines, an electric filter 3 is positioned. This filter may consist of a blocking condenser 4 and an inductance 5. Opposite sides of the inductance are connected to the input terminals of a full wave bridge type rectifier indicated generally by the reference character 6, preferably a current limiting resistor 7 being interposed in this circuit. The output terminals of the full wave rectifier 6 are connected to the energizing coil 8 of a sensitive relay 9. The armature 10 of the relay constitutes the movable contact member and is adapted to engage the stationary contact 11 when the relay 9 is energized. When this occurs, a self-starting, synchronous motor 12 is connected between the mains 1 and 2.

The self-starting, synchronous motor 12 is provided with a reduction mechanism including a normally open magnetic clutch 13 interposed between such motor and the operating or drive shaft 14. This magnetic clutch is of well known construction and is open when the motor is not energized and closes magnetically when the motor is energized.

The shaft 14 carries an operating arm 15 which is arranged to engage the lower arm 16 of a trip member indicated generally by the reference character 17. This trip member is urged by a spring 18 in a counterclockwise direction and is provided with an upper arm 19 arranged to trip a resilient or spring urged latching lever 20 when the operating arm or member 15 is rotated by the synchronous motor in a counterclockwise direction into engagement with the arm 16. This tripped position is shown in Figure 3. However, the position shown in Figure 3 is only a transient or temporary position as will be apparent as the description proceeds. It is to be noted, however, that the trip member 16 does not again operate the latch lever 20 when the operating arm 15 is rotated in a clockwise direction. Provision is made for rotating the shaft 14 and the arm 15 in a clockwise direction by the provision of a spring 21, see Figures 2 and 3, which imparts a torsional bias to the shaft 14 and the arm 15 tending to rotate them in a clockwise direction reversely to the direction of rotation imparted thereto by the motor.

Figure 2:
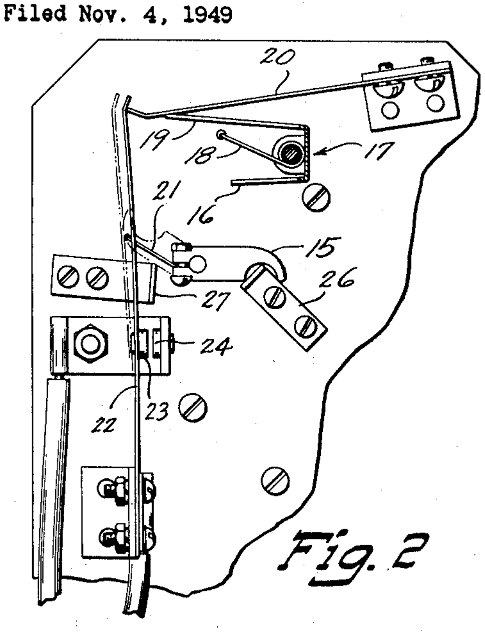
Figure 2 shows a fragment of a portion of a receiver, showing such receiver in its "off" or switch open position.
Figure 3:
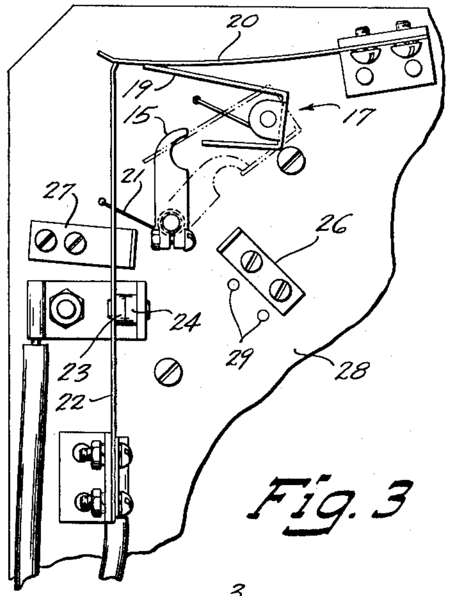
Figure 3 is a view similar to Figure 2 showing the receiver in its "on" or switch closed position, such view, however, showing a slight modification of that shown in Figure 2.

Normally the latch arm 20 is in the position shown in Figure 2 and restrains the movable arm or spring lever 22 of the power switch. This movable arm 22 is provided with a movable contact 23 which is arranged to engage a stationary contact 24 to thereby connect a load of any suitable type indicated by the reference character 25 between the mains 1 and 2. This load may be any apparatus operated by electric power.

Normally the operating arm 15 rests against the zero position stop indicated by the reference character 26, see Figure 2. This zero position stop holds the operating arm in its zero position as shown in Figure 2 when the motor is not energized. When the motor is energized for a brief interval, for example twenty seconds, the operating arm 15 is rotated or rocked to the position shown in Figure 3 and thus serves to trip the latch lever 20 and allow the switch to close. When the motor is deenergized, the operating arm 15 returns to its zero position without disturbing the power switch, as hereinabove described, as the trip member 17 moves to its dotted line position as shown in Figure 3 on the reverse rotation of the operating arm 15 and does not have any effect on any other portion of the apparatus. It merely snaps back to its initial position shown in Figure 2. On the other hand, if the motor is operating for a longer interval of time, for example, forty seconds, the operating arm rotates past the position shown in Figure 3 to the dotted line position shown in Figure 2 where it is stopped by the limit stop 27. The period of energization of the motor for the "off" operation of the receiver is more than sufficient to rock the operating arm 15 to the outer limit stop 27. However, the motor is not sufficiently powerful to damage the operating arm or the intermediate reduction mechanism when stopped by the stop 27.

When a carrier current of a predetermined frequency is interposed on the mains 1 and 2, it is apparent that the electric filter 3 which is arranged to resonate at such frequency will build up a voltage between opposite terminals of the inductance 5. The bridging rectifier 6 will furnish direct current to the sensitive relay 9, thus closing the motor circuit, and the motor will function to either open or close the main power switch as previously described, depending on the time interval during which the carrier current is on.

While it is preferable to use a synchronous motor as most of the systems with which the apparatus is employed are alternating current systems, it nevertheless is within the province of this invention to employ a constant speed motor of a different type if so desired.

In the modified form of the invention shown in Figure 3 the supporting partition or wall 28 is provided with additional threaded apertures 29 so that the zero stop 26 can be positioned at any selected point. This alteration allows for the setting of certain receivers for different time intervals from that of other receivers and thereby provides a simple way of selectively controlling different receivers or different groups of receivers.

Figure 1:
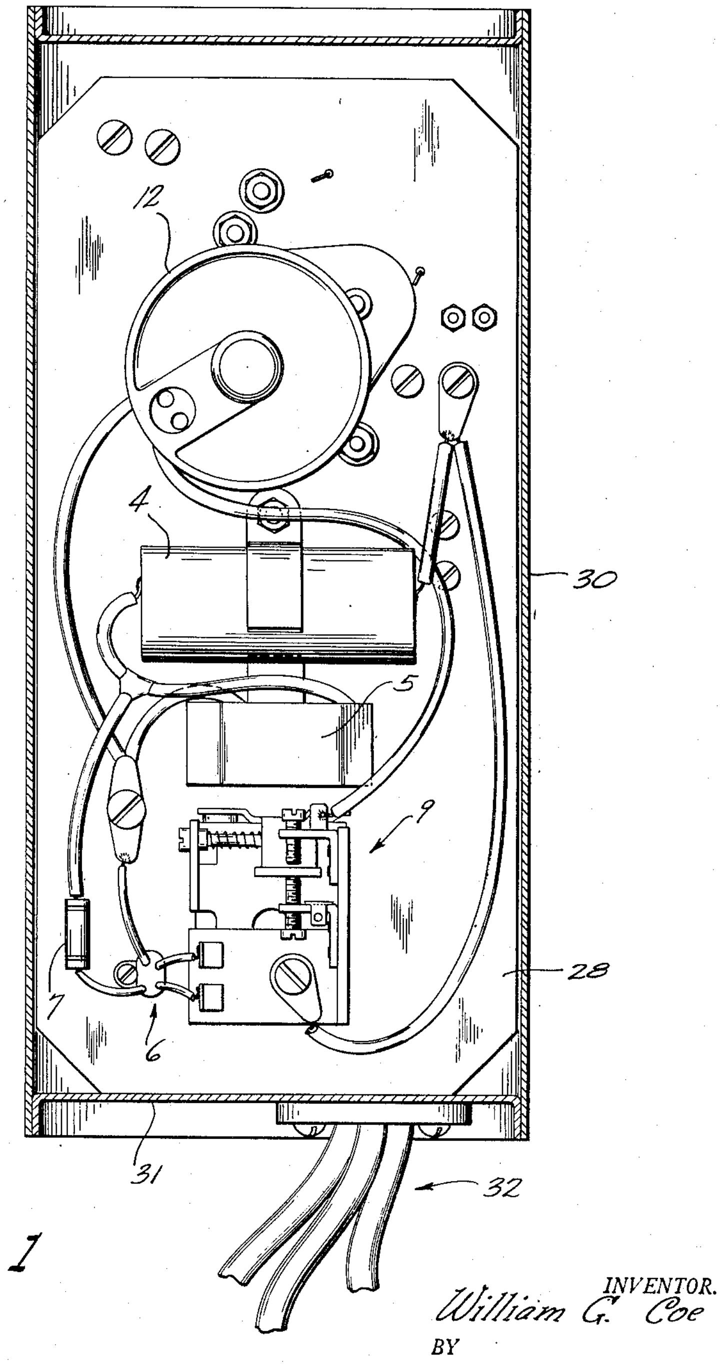
Figure 1 is a vertical, sectional view through one of the receivers.

A convenient way of mounting the apparatus is to enclose the entire device within an inverted can or housing 30, see Figure 1, which tightly and removably fits a base member 31. The partition 28 may merely rest upon the base 31 or may be secured thereto in any way desired. Also the relatively stiff leads 32 may be relied upon to assist in holding the partition in place. It is to be noted that the can 30 definitely positions the partition and prevents its shifting or tilting.

Also it is preferable to mount the switch mechanism and the immediately associated parts on one side of the partition as shown, for example, in Figures 2 and 3, and to mount the motor, filter, rectifier, and sensitive relay on the other side of the partition as shown in Figure 1.

It will be seen that a novel form of control system and receiver have been provided by this invention which are simple and yet which have the characteristics hereinabove enumerated.

Although this invention has been described in considerable detail, it is to be understood that such description is intended as illustrative rather than limiting, as the invention may be variously embodied and is to be interpreted as claimed.

I claim:

1. A remote controlled electric switch designed for use in a system where controlling impulses are furnished for two different lengths of time, said remote controlled electric switch comprising a motor designed to rotate in one direction only, means controlled by said impulses for energizing said motor for two different lengths of time, a switch, biasing means biasing said switch towards switch-closed position, latch means operatively engaging said switch for latching said switch open, trip means for tripping said latch means and engaging said latch when moved in a first direction and ineffective to alter the action of said latch means when moved in a second direction, said trip means being operated from said motor, switch operating means driven by said motor from a zero position to a first position to move said tripping means in said first direction or to open said switch when moved to a second position beyond said first position when said motor has operated two different predetermined lengths of time, respectively, a normally open magnetic clutch between said motor and said switch operating means arranged to magnetically close when said motor is energized, and biasing means for returning said switch operating means from said first or second position to zero position, said switch operating means being rotated by said motor in the same direction and less than a full revolution to both the first and second position.

2. A remote controlled electric switch designed for use in a system where controlling impulses are furnished for two different lengths of time, said remote controlled electric switch comprising a motor designed to rotate in one direction only, means controlled by said impulses for energizing said motor for two different lengths of time, a switch, biasing means biasing said switch towards switch-closed position, a latch operatively engaging said switch for holding said switch open, tripping means operated from said motor and engaging said latch for tripping said latch, switch operating means driven from said motor from a zero position in the same direction to either a first or a second position to respectively operate said tripping means or to open said switch when said motor has operated two different predetermined lengths of time, respectively, a normally open magnetic clutch between said motor and said switch operating means arranged to magnetically close when said motor is energized, and biasing means for biasing said switch operating means to return to zero position, said switch operating means being rotated by said motor less than a full revolution for either said first or second position.

3. A remote controlled electric switch designed for use in a system where controlling impulses are furnished for two different lengths of time, said remote controlled electric switch comprising a motor designed to rotate in one direction only, means controlled by said impulses for energizing said motor for two different lengths of time, a switch, biasing means for biasing said switch towards switch-closed position, a latch operatively engaging said switch for holding said switch open, tripping means operated from said motor and engaging said latch for tripping said latch, switch operating means driven from said motor from a zero position in the same direction to either a first or a second position to respectively operate said tripping means or to open said switch when said motor has operated two different predetermined lengths of time, respectively, biasing means for biasing said switch operating means to return to zero position, and a normally open clutch interposed between said switch operating means and said motor and arranged to be magnetically closed when said motor is energized, said switch operating means being rotated by said motor less than a full revolution for either said first or second position.

4. A remote controlled electric switch designed for use in a system where controlling impulses are furnished for two different lengths of time, said remote controlled electric switch comprising a motor designed to rotate in one direction only, means controlled by said impulses for energizing said motor for two different lengths of time, a switch, biasing means for biasing said switch towards switch-closed position, a latch operatively engaging said switch for holding said switch open, tripping means operated from said motor and engaging said latch for tripping said latch, switch operating means driven from said motor from a zero position in the same direction to either a first or a second position to respectively operate said tripping means or to open said switch when said motor has operated two different predetermined lengths of time, respectively, biasing means for biasing said switch operating means to return to zero position, a normally open magnetic clutch between said motor and said switch operating means arranged to magnetically close when said motor is energized, and an adjustable zero stop for adjustably determining the said zero position, whereby the time interval between zero position and the said first and second positions may be varied, said switch operating means being rotated by said motor less than a full revolution for either said first or second position.

References Cited in the file of this patent

UNITED STATES PATENTS

| | | |
|---|---|---|
| 1,483,433 | Hall | Feb. 12, 1924 |
| 1,575,010 | Scheer | Mar. 2, 1926 |
| 1,941,377 | Woodworth | Dec. 26, 1933 |
| 1,949,590 | Trogner | Mar. 6, 1934 |
| 2,103,907 | Kearsley | Dec. 28, 1937 |
| 2,180,948 | Bassett | Nov. 21, 1939 |
| 2,231,174 | Trogner | Feb. 11, 1941 |
| 2,325,860 | Kizaur | Aug. 3, 1943 |
| 2,443,452 | Hall | June 15, 1948 |
| 2,500,956 | Mershon | Mar. 21, 1950 |

FOREIGN PATENTS

| | | |
|---|---|---|
| 359,733 | Germany | Sept. 26, 1922 |